2 Sheets—Sheet 1.

J. W. HATCH,

Assignor to H. G. THOMPSON, Trustee of the MAGNETIC LASTING MACHINE ASSOCIATION.

Lasting-Machine.

No. 8,764. Reissued June 17, 1879.

Witnesses.

Jos. P. Livermore

Lawrence F. Connor.

Inventor.

Jesse W. Hatch by Crosby & Gregory

Attys

2 Sheets—Sheet 2.

J. W. HATCH,

Assignor to H. G. THOMPSON, Trustee of the MAGNETIC LASTING MACHINE ASSOCIATION.

Lasting-Machine.

No. 8,764. Reissued June 17, 1879.

Witnesses.

Jos. P. Livermore

L. F. Connor.

Inventor.

Jesse W. Hatch, by Crosby & Gregory

Attys

UNITED STATES PATENT OFFICE.

JESSE W. HATCH, OF ROCHESTER, N. Y., ASSIGNOR TO HENRY G. THOMPSON, TRUSTEE OF THE MAGNETIC LASTING MACHINE ASSOCIATION.

IMPROVEMENT IN LASTING-MACHINES.

Specification forming part of Letters Patent No. 193,446, dated July 24, 1877; Reissue No. 8,764, dated June 17, 1879; application filed May 2, 1879.

*To all whom it may concern:*

Be it known that I, JESSE W. HATCH, of Rochester, in the county of Monroe and State of New York, have invented an Improvement in Mechanism for Lasting Shoes or Boots, of which the following is a specification.

This invention relates to mechanism for lasting shoes or boots to be soled in any usual way.

The invention consists in the combination, with the toggle-joint and the crimping or pulling jaws that draw the upper about the sole and last, of a lever and link to operate the toggle-joint; also, in a lasting-machine, an independent toe-support for the last, a pivoted or tipping plate or support, and jaws or pullers to operate upon the toe of the upper, combined with adjusting devices to tip the plate and adapt the jaws or pullers to the curvature or spring of the last at its toe; also, in crimping jaws or pullers, in combination with a pivoted tipping or supporting plate, slotted to guide the pivot of the jaws, and with a spring to regulate the downward pressure of the plate and jaws, substantially as described; also, in the employment of crimping or pulling jaws having openings in their acting faces back from their edges, to permit the passage of a tack adapted to be driven by a driver; and, also, in a lasting mechanism supported upon a movable rod or jack, and adapted to be presented to a tacking mechanism, whereby a shoe may be lasted and tacked in a single machine.

Figure 1:
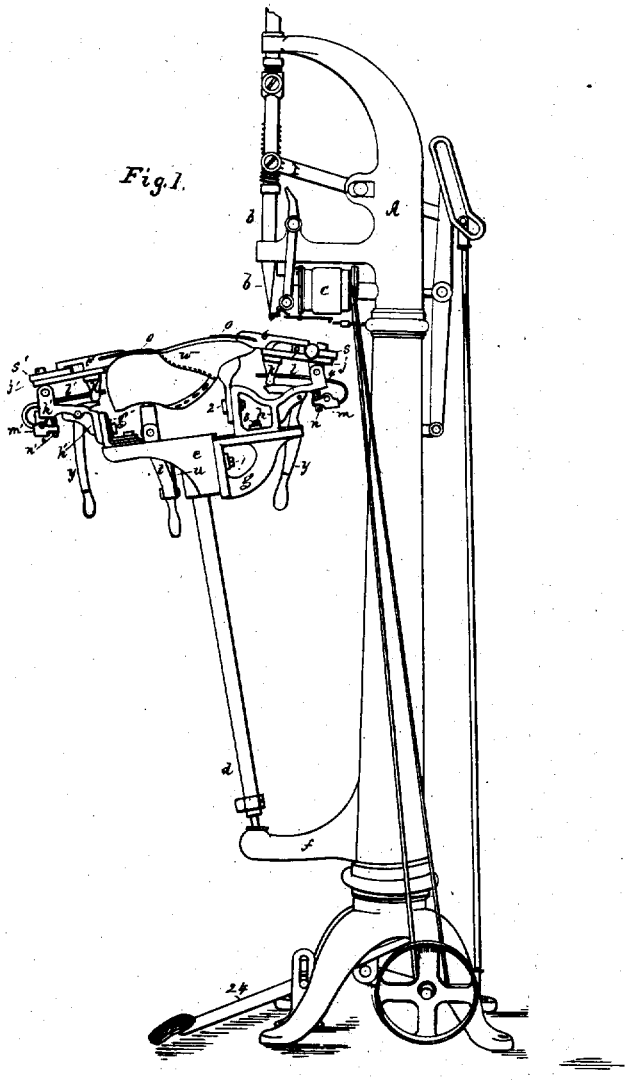
Figure 2:
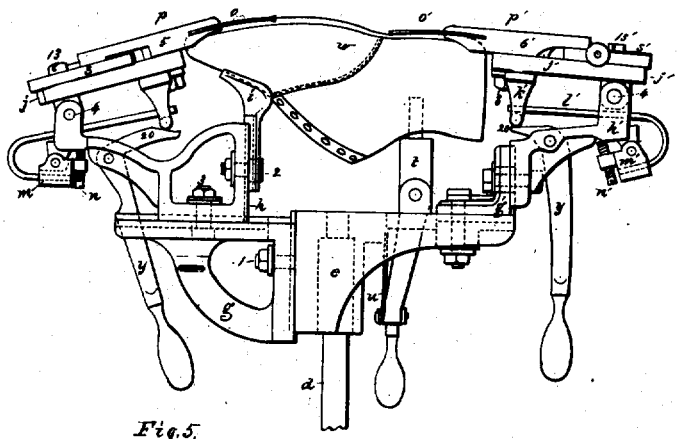
Figure 5:
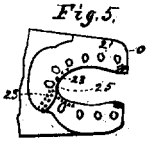
Figure 6:
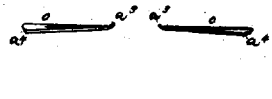
Figure 3:
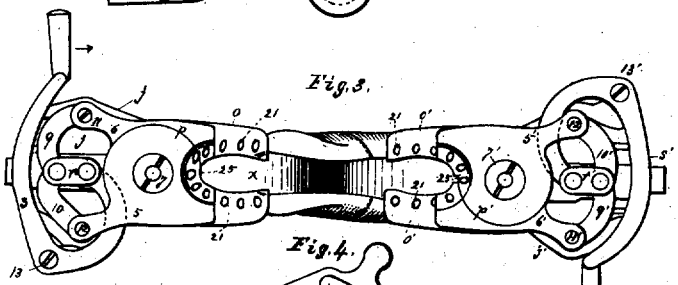
Figure 4:
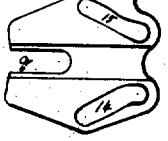

Figure 1 represents my improved lasting devices adapted to a machine for automatically driving tacks or nails into the upper and holding it to the inner sole. Fig. 2 is a side view of the lasting devices mounted upon a revolving jack, the jack-standard being shortened to save room upon the drawings. Fig. 3 is a top view thereof; Fig. 4, a detail of the tipping or supporting plate; Fig. 5, an under-side view of the crimping-jaws for the toe. Fig. 6 shows the elastic working portions of one pair of the jaws or pullers in front view.

The drawings, Fig. 1, represent my invention embodied with a tacking-machine known as the "magnetic tacking-machine," and constructed substantially in accordance with United States Letters Patent Nos. 143,388, 152,927, and 156,047, to which reference may be had.

The main standard (herein marked A) of the tack-driving mechanism, the hammer *b*, the feeding-cylinder *c*, tack-presenting mechanism, and the rod *d* for supporting my lasting devices are all substantially as described in said patents, the driver being a magnetic driver. The foundation-casting *e*, upon which are secured the different portions of the lasting devices, is attached at the upper end of the rod *d*, having at its lower end a ball-joint to fit an opening or socket in an arm, *f*, of the frame of the tack-driver. At one end of this casting *e* is attached, by a screw, 1, a bracket, *g*, arranged at its top to receive and guide a standard, *h*, to which is adjustably secured, by a bolt, 2, a toe-rest, *i*, which is entirely independent of the tipping or supporting plate *j*, which controls the position of the jaws or pullers, which operate upon the upper to force it over horizontally upon the inner sole laid upon the last-bottom.

The standard *h* is made horizontally adjustable by means of a bolt, 3. At one end this standard has pivoted to it, at 4, a tipping supporting-plate, *j*, that supports and guides the pair of crimping-jaws for the toe. This supporting-plate is provided with a lug, *k*, or equivalent, which is engaged by a spring, *l*, attached to, in this instance, a pivoted block, *m*, provided with a screw, *n*, or equivalent device, for adjusting the block *m* to increase or lessen the action of the spring upon the supporting-plate, and consequently the pressure of the pullers or working portions *o* of the jaws *p*, composed of two members, 5 6, pivoted together by a pivot, 7, extended through a slot, *q*, in the plate *j*, a nut, 8, preventing the jaws from rising as the pivot 7 reciprocates in such slot when the jaws are moved backward and forward and opened and closed by the action of the toggle-lever, composed of the members 9 10, pivoted upon the pins 11 12 of the members 6 5 of the crimping or pulling jaws.

The central portion of the toggle-lever is connected by a link, *r*, with one end of lever *s*, pivoted at 13.

The pins 11 12 extend through slots 14 15 in the supporting-plate, the slots acting as guides for the pivots, to insure the movement of the jaws in a right line as they are reciprocated and closed and opened.

The jaws so far described are for fitting the upper about the toe of the last.

At the opposite end of this casting *e* is attached a horizontally-adjustable bracket, *g'*, and to *g'* is attached a rest, *h'*, to which is pivoted a second tipping supporting-plate, *j'*, adapted to sustain the crimping or pulling jaws *p'*, composed of members 5' 6', operated by toggle-lever 9' 10' and lever *s'*, constructed and operated as the corresponding parts of the toe-fitting devices. The parts just referred to, and represented at the right of Figs. 2 and 3 and at the left of Fig. 1, are adapted to fit the quarter of the shoe about the heel of the last.

Adjusting devices for the tipping plates—said devices being shown as levers *y*, pivoted on the portions *h h'*, and provided with toes 20—act upon the lugs *k* or *k'* to elevate the supporting-plate *j* or *j'* and jaws *p* or *p'*, to introduce or remove the shoe and last and place the jaws in such position with relation to the pivot of the plate *j* and the toe-rest, which is not moved by this tipping movement of the plate *j*, so as to permit the jaws or pullers to be readily adapted in position to the curvatures or spring of the last at its toe.

When the levers *y* no longer hold up the plates *j j'* the springs *l* and *l'* act to press the acting portions *o o'* of the jaws *p p'* down firmly upon and so as to engage the upper, and fit or pull its edges over the last.

The upper to be lasted is properly placed upon a last supported upon a pivoted last-pin, *t*, provided with a handle and a spring, *u*, to hold the toe of the last pressed forward toward the toe-rest *i*.

The handle upon the pivoted last-pin aids the operator in placing the heel and toe in correct position with relation to the movement of the jaws and in removing and replacing the last.

When the last is put in place with an upper, *w*, and an insole, *x*, thereon, as shown in the drawings, (the jaws *p p'* having been drawn back away from the last, and the acting portions *o o'* thereof being opened,) the operator seizes the hand-levers *s* and *s'* and moves them in the direction of the arrows, such movement straightening the toggle-levers, and at the same time moving the jaws longitudinally and closing them.

In United States Letters Patent heretofore granted to me, and numbered 173,405, I show jaws for lasting; but such jaws have notches formed in their concaved edges for the reception of tacks.

As the concaved edges of these jaws meet the upper at the edges of the last and fold the bottom edges thereof closely about the last, working from the outside toward the central line of the last in all directions, it is obvious that the edges of the upper will be fitted and crimped to conform to the curvature of the last at its edges.

The full portions of the edges of the upper rise or bunch or curve upward opposite these notched portions in the concaved edges of the jaws, presenting convex portions or bunches not firmly pressed in contact with the insole, and when tacks are being driven therein they are liable to glance upon these convexed or bunched portions of the upper. This difficulty is a very serious one in practice when the tacks are being driven by hand.

To overcome this difficulty the concaved working edges of the working members *o o'* of the jaws (these members being made of spring-metal, and elastic rather than rigid, as in such patent) are made without notches for the reception of the tacks, but instead are provided with large holes 21, made therein back from their concaved working edges.

The portions of the concaved edges immediately opposite the holes—preferably elongated holes—operate upon the edges of the upper, and prevent the formation of bunches in the edges of the upper, or prevent it buckling up and presenting a convex surface at the point at which the tack is to be driven. This construction of the working edges of working members of the jaws enables the edges of the upper to be held down firmly against the insole at the points where tacks are to be driven.

In using a magnetic hammer for driving tacks it will be remembered that the face of the magnet does not possess any considerable power to hold the tack against lateral movement; and if the leather or edge of the upper into which a tack was to be driven by a magnetic hammer were bunched up, the tack would be diverted from its straight path, and it could not be driven with any degree of certainty; but with jaws constructed with holes such as described, and with edges to bear upon the edges of the upper in advance of the holes, the edges of the upper are kept smooth, and the tack or nail can be readily driven straight through the substance of the said upper.

The under sides of the jaws for the toe (see Fig. 5) are provided with serrations or rasp-like points 23, that engage the edge of the upper and aid the working portions *o* in drawing or wiping its edges over the edge of the last, and in holding such edges in position to receive the tacks or nails driven through the holes 21.

When the concaved working edges of the working members are formed as herein described it is possible to last a shoe with a narrower or less portion of the edge of the upper bent over upon the inner sole than is the case when notched jaws are employed, and stock is therefore saved.

When the shoe is properly drawn and fitted to the last, as above described, the operator moves the jack (the rod permitting it to be moved at will in either direction) so that the holes 21 will come in line with the end of the hammer or nail-driver rod, and the hammer will then be thrown down to drive a tack or nail through said hole and into the upper and inner sole, confining them in position to be subsequently united by any usual process of nailing, sewing, or pegging.

After the upper is tacked to the inner sole the jaws are lifted and withdrawn, and the last is removed from the pin *t*.

I prefer, in connection with my lasting devices shown in Figs. 2 and 3, to employ a magnetic hammer; but it is understood that a hammer or driver-rod not magnetized might be used in connection with suitable devices to operate the driver-rod and to present the tacks to be driven.

The driving-rod will be so operated as to drive a tack, then to rise from its lowest position, and then to rest until a new opening, 21, is placed under the driver or hammer, when the operator will again, through a lever, 24, or equivalent, connect the driver-operating devices with the constantly-rotated pulley of the machine, which will drive another tack, after which the driver will then again rest, and so on.

The under side of the jaws for the toe-portions of the upper is provided with a space (represented at 25, Figs. 3 and 5,) for the reception of the seam extending from the toe up along, over, and in the direction of the length of the foot, such a seam being common in ladies' cloth shoes and in some leather shoes. This provision obviates pulling the seam-portion of the upper more than the other adjacent portions.

The elastic working portions *o* of the jaws or pullers are turned or curved upward at their inner corners, $a^3$, and the jaws from their inner concave to their outer convex edges, $a^4$, incline downward. This construction of the jaws permits them to rest at their upturned or elevated inner corners upon the upper when preparing the work for the operation of the jaws in pulling the upper over the last, and also prevents the inner corners of the jaws cutting the upper, and as the jaws are closed the outer lower edges, $a^4$, press harder and harder on the upper turned over the last.

The toe-rest herein described being detached from the plate *j*, which carries the jaws or pullers, permits the ready adjustment of the jaws or pullers to the spring of the last without also moving the toe-rest with it.

The plate *j* and jaws or pullers, as constructed—the tacks or nails having been driven into the upper and inner sole—may, by means of the lifting device, be raised and withdrawn from the upper and inner sole and be moved backward without coming in contact with the same, and consequently all backward strain of the jaws or pullers on the upper is obviated.

By elongating the slots in the jaws headed tacks or nails can be readily driven, and the jaws are thereby adapted to the uppers of shoes of different width, and to permit the tacks or fastenings to be driven at the proper or necessary distance from the edge of the upper.

I claim—

1. In a lasting-machine, crimping jaws or pullers provided with elongated holes back of their working-edges, to permit tacks or other fastenings to be driven by a driver through the said holes below the under side of the said jaws or pullers and into the upper to secure it to the inner sole, substantially as described.

2. In a lasting-machine, a pair of pivoted and horizontally-movable crimping-jaws provided with elongated holes back of their continuous working-edges, to thereby permit tacks to be driven through the said holes by a driver, and the same jaws to be employed with shoes of different sizes.

3. Crimping jaws or pullers to draw over and plait in the uppers of boots and shoes preparatory to lasting the same, in combination with a toggle-joint and a lever and link to operate the toggle-joint and jaws, all substantially as described.

4. A pair of crimping-jaws connected by an elongated pivot, 8, and provided with backwardly-extended portions 5 6, having pins, in combination with a pivoted supporting-plate provided with slots *q*, 14, and 15, and with mechanism to longitudinally reciprocate the jaws above the supporting-plate, to operate substantially as described.

5. In a lasting-machine, an independent toe-rest for the last and upper near its toe end, an independently tipping or supporting plate, and jaws or pullers to operate upon the upper at the toe end of the last, combined with an adjusting device to place and adapt the jaws or pullers to the curvature or spring of the last at the toe, substantially as described.

6. In a lasting-machine, lasting jaws or pullers to lay the edges of the upper over upon the face of the inner sole, combined with devices to lift the jaws or pullers from contact with the upper after the completion of their closing-in movement and before their backward movement, to permit the jaws or pullers to be moved backward without contact with the upper on the last, substantially as described.

7. Crimping jaws or pullers to draw over and plait in the uppers of boots and shoes, in combination with the pivoted supporting-plate, slotted at *q*, to guide the jaws, and a spring to regulate the downward pressure of the plate and jaws, substantially as described.

8. The pivoted supporting-plate, in combination with the crimping jaws or pullers and pivot 7, adapted to move in the slotted portion *q* of the plate, substantially as described, and for the purpose set forth.

9. In a lasting-machine, a vertically-adjustable toe-support and a longitudinally-adjustable rest for the toe-support and a tipping-plate, combined with an adjustable tipping-plate and longitudinally-moving jaws or pullers put in position with relation to the toe of the last by adjustment of the plate, to operate substantially as described.

10. Crimping jaws or pullers to push and draw over and plait in the uppers of boots and shoes, in combination with an automatically-operated hammer or driver, to drive tacks or nails through holes made in the working portions of the jaws, substantially as described.

11. The crimping-jaws and mechanism to operate them to push and draw over the edge of the upper at both the heel and toe, in combination with a rod provided with a ball-like termination or end, to permit the rod and lasting devices to be moved freely in any direction to present the heel and toe of the shoe or boot to a tack-driving mechanism, substantially as described.

12. The elastic crimping jaws or pullers, provided with elevated inner corners to rest upon the uppers at the edge of the last, and made lower at their outer edges than at their inner edges, to operate substantially as described.

13. The combination, in a lasting-machine, of the following instrumentalities, viz: a pivoted supporting-plate, a pair of crimping-jaws loosely connected therewith, mechanism to reciprocate the jaws longitudinally with reference to the plate and to close the jaws as they are moved forward, and a spring to hold the pulling portions of the jaws and forward end of the pivoted plate pressed downward, so that the pulling portions bear with a yielding pressure upon the upper to pull it over the inner sole.

14. In a lasting-machine, a tipping-plate located at the toe end of the last-supporting devices, combined with jaws or pullers and mechanism to operate them, substantially as described, whereby the jaws are moved forward and closed simultaneously to fit the upper closely to the edges of the last.

15. In a lasting-machine, a pair of jaws lapped the one over the other, to turn on a center common to both, combined with a system of links connected with their outer ends to aid in opening the said jaws, as and for the purpose described.

In testimony whereof I have hereunto set my hand this 15th day of February, A. D. 1879, in the presence of two subscribing witnesses.

JESSE W. HATCH.

Witnesses:
EDWD. W. ALBERT,
GEO. L. HENDERSON.